(12) United States Patent
Zelinski

(10) Patent No.: US 7,219,775 B2
(45) Date of Patent: May 22, 2007

(54) ATTACHMENT FOR PREVENTING REVERSE ROTATION OF A SHAFT

(75) Inventor: Elgin Richard Zelinski, Winnipeg (CA)

(73) Assignee: CML Northern Blower Inc., Winnipeg, Manitoba (CA)

( * ) Notice: Subject to any disclaimer, the term of this patent is extended or adjusted under 35 U.S.C. 154(b) by 360 days.

(21) Appl. No.: 10/870,978

(22) Filed: Jun. 21, 2004

(65) Prior Publication Data
US 2005/0279590 A1    Dec. 22, 2005

(51) Int. Cl.
*B60T 8/72* (2006.01)

(52) U.S. Cl. .................. 188/180; 188/82.7; 188/82.77

(58) Field of Classification Search ............... 188/180, 188/82.77, 82.7, 185, 186, 189; 192/223.1; 310/41, 77
See application file for complete search history.

(56) References Cited

U.S. PATENT DOCUMENTS 2,687,785 A * 8/1954 Whitney ................... 188/82.7
2,750,007 A * 6/1956 Turner et al. ............ 188/82.77
4,410,072 A * 10/1983 Dickinson et al. ........ 192/223.1
4,647,801 A * 3/1987 Swartwout ................... 310/41

* cited by examiner

*Primary Examiner*—James McClellan
*Assistant Examiner*—Mariano Sy
(74) *Attorney, Agent, or Firm*—Adrian D. Battison; Michael R. Williams; Ryan W. Dupuis

(57) ABSTRACT

A fan rotor is mounted on a shaft carried on bearings attached to a base plate and there is provided an assembly for preventing reverse rotation of the fan which could damage the motor. A stop plate is mounted on the base adjacent the shaft with an edge adjacent the shaft. A pair of wing members are carried on the shaft on two collar pieces so that each wing member is pivotal between ends of the collar pieces about an axis parallel to the tangent to the shaft at the wing member. The wing members are V-shaped and pivot so that one leg moves under gravity either in the vertical or horizontal orientations of the shaft from a retracted position, in which it is free from the stop plate to an extended position in which it engages the abutment surface of the stop member to prevent reverse rotation. The wing members are shaped and weighted such that rotation of the shaft beyond a predetermined angular velocity causes centrifugal force to move the wing members to the retracted position.

27 Claims, 9 Drawing Sheets

ATTACHMENT FOR PREVENTING REVERSE ROTATION OF A SHAFT

This invention relates to an attachment for preventing reverse rotation of a shaft.

BACKGROUND OF THE INVENTION

There is a requirement in many cases for a shaft which is mounted on bearings to have a device attached to the shaft which prevents reverse rotation of the shaft.

This is particularly required in regard to the shaft for carrying a fan since the fan has a tendency to rotate in the reverse direction when there is no drive to the motor due to reverse air flow through the fan. When the air flow is particularly strong, a significant reverse rotation can be obtained which can lead to damage of the motor and/or motor drive components when the motor is started for rotating the fan in the required drive direction. However the present invention is not limited to such arrangements using a fan and can be used wherever such a device is required.

Previous designs have been proposed for mounting on a shaft a device for preventing reverse rotation. One example is manufactured by Twin City Fan and Blower of Minneapolis, Minn. and the construction of this device is described in more detail herein after.

Basically the Twin City device includes a wing member mounted on the shaft which is thrown outwardly by rotation of the shaft due to its weight which retracts a portion of the wing member to prevent that portion engaging a stop which is in fixed position relative to the shaft.

This arrangement has some disadvantages particularly that it can only be used only in a horizontal orientation of the shaft because in the vertical orientation there is no force tending to move the wing member to the abutment position for abutting the stop to prevent the reverse rotation. Also the construction of the Twin City device is relatively complex leading to a higher cost construction.

SUMMARY OF THE INVENTION

It is one object of the invention to provide an apparatus for use in preventing reverse rotation of a shaft.

According to one aspect of the invention there is provided an apparatus comprising:

a base member;

a shaft carried on bearings attached to the base member in a mounting plane of the base member such that the shaft rotates about an axis spaced from the base member;

and an assembly for use in preventing reverse rotation of the shaft carried on a base member, the apparatus comprising:

a stop member mounted on the base adjacent the shaft, the stop having an abutment surface at a position spaced outwardly from the shaft;

a mounting member mounted on the shaft;

at least one wing member mounted on the mounting member;

the or each wing member being mounted on the mounting member for pivotal movement relative to the shaft about an axis generally at right angles to the axis and parallel to a tangent to the axis at its respective position on the shaft;

the or each wing member being pivotal from a retracted position, in which it is free from the stop member to allow the shaft to rotate without engagement of the wing member with the stop member, to an extended position in which it engages the abutment surface of the stop member to prevent reverse rotation;

the or each wing member being shaped and arranged such that, with the shaft stationary, gravity acting upon the wing member moves the wing member into the extended position for engaging the stop member;

and the or each wing member being shaped and arranged such that rotation of the shaft beyond a predetermined angular velocity causes centrifugal force to move the wing member to the retracted position.

The term "wing member" as used herein is not intended to imply any particular shape of the members.

The arrangement defined above thus has the advantage that it avoids the use of springs which are susceptible to wear or damage and uses gravity and centrifugal forces to effect the movement of the wing members.

Preferably each wing member is shaped and arranged such that, with the axis of the shaft vertical and with the shaft stationary, gravity acting upon the or each wing member moves the wing member from the retracted position into the extended position for engaging the stop member. As the vertical condition has greater difficulties in moving the wing members depending upon the geometry, satisfying this requirement in regard to the vertical orientation of the shaft also can generally satisfy the same requirement in respect of a horizontal orientation of the shaft. Thus the same geometry can be used in vertical and horizontal orientations both of which are commonly required.

Preferably the stop member includes a guide surface for engaging the wing member located at an angular position thereon which is angularly retarded relative to the abutment surface and relative to the direction of forward rotation of the shaft such that, as the shaft and the wing member thereon rotate in the forward direction at an angular velocity less than said predetermined velocity, the wing member engages the guide surface and is moved thereby into the retracted position to by-pass the abutment surface.

Preferably there are two wing members arranged on the mounting member at diametrically opposed positions relative to the axis of the shaft. This has the advantage of balancing the system but other numbers of wing members can be used.

Preferably the mounting member and the wing member are arranged such that the outermost extent thereof is spaced from the axis of the shaft by a distance less than the distance of the mounting plane from the axis such that the wing member does not impact the mounting member as it rotates. This avoids the necessity of modifying the base plate with holes or slots.

Preferably the mounting member comprises a collar which is separate from and is clamped around the shaft.

Preferably the collar is formed of a plurality of separate pieces each fastened to the next by a screw fastener such the pieces are pulled radially inwardly by the screw fasteners.

Preferably each wing member is mounted at a junction between two collar pieces.

Preferably each collar piece has an end face generally radial to the axis such that the wing member is located between the end faces for pivotal movement on the screw fastener between the two collar pieces.

Preferably for balance there are two collar pieces and two wing members each located between respective ends of the collar pieces.

Preferably each wing member has a generally v shaped abutment edge defining two leg portions and an apex adjacent the shaft and is pivotal about its axis adjacent an apex of the v-shaped abutment edge such that the retracted and extended positions are defined by engagement of respective ones of the leg portions on the outer surface of the shaft.

Preferably one of the leg portions has a greater weight than the other so as to move outwardly from the shaft under centrifugal forces.

Preferably the leg portions are of equal length and one carries a weight member thereon.

Preferably the leg portions are arranged such that the weight portions are on the same axial side of the mounting member.

Preferably the leg portions have a length such that the leg portions do not reach the mounting plane thus avoiding interfering with the base plate.

Preferably the stop member comprises a plate portion cut from sheet metal lying in a radial plane of the axis of the shaft and having the abutment surface at one edge of the plate portion.

Preferably the wing members and the stop member and the mounting member are formed from laser cut pieces. However other techniques for manufacture such as plasma cutting, punching or pressing can be used.

In one particular end use, there is a fan mounted on the shaft for driving by a motor, since the fan has a tendency to rotate in the reverse direction due to air flow though the fan which can damage the motor on start up.

According to a second aspect of the invention there is provided an apparatus comprising:

a base member;

a shaft carried on bearings attached to the base member in a mounting plane of the base member such that the shaft rotates about an axis spaced from the base member;

and an assembly for use in preventing reverse rotation of the shaft carried on a base member, the apparatus comprising:

a stop member mounted on the base adjacent the shaft, the stop having an abutment surface at a position spaced outwardly from the shaft;

a mounting member mounted on the shaft;

at least one wing member mounted on the mounting member;

the or each wing member being mounted on the mounting member for pivotal movement relative to the shaft from a retracted position, in which it is free from the stop member to allow the shaft to rotate without engagement of the wing member with the stop member, to an extended position in which it engages the abutment surface of the stop member to prevent reverse rotation;

and the or each wing member being shaped and arranged such that rotation of the shaft beyond a predetermined angular velocity causes centrifugal force to move the wing member to the retracted position;

wherein the mounting member comprises a collar which is separate from and is clamped around the shaft;

wherein the collar is formed of a plurality of separate pieces each fastened to the next by a screw fastener such the pieces are pulled radially inwardly by the screw fasteners;

and wherein each wing member is mounted at a junction between two collar pieces.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 9:
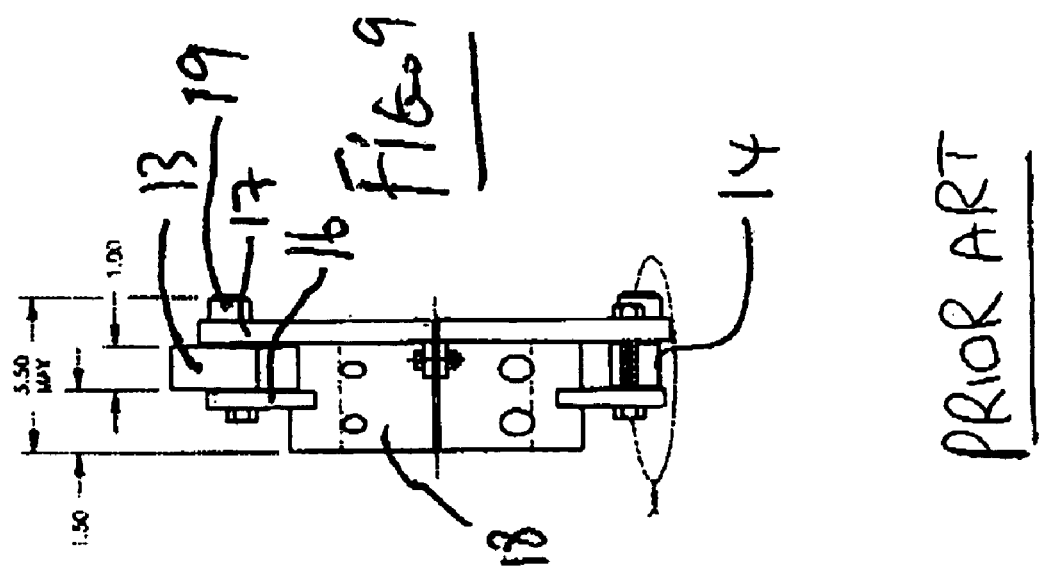
FIG. 9 is a side elevational view of the device of FIG. 8.
Figure 8:
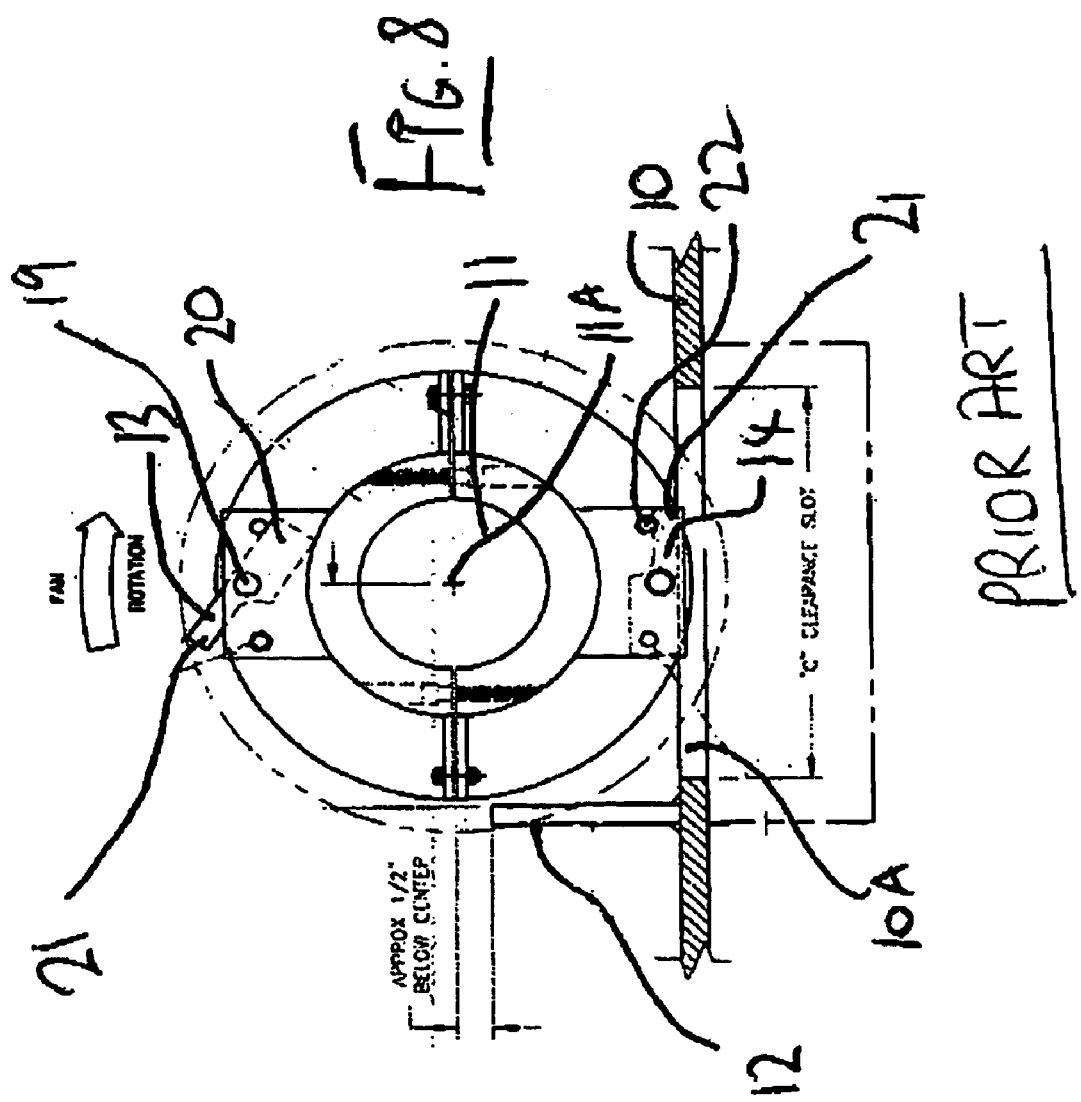
FIG. 8 is an end elevational view of a prior art device.

In FIGS. 8 and 9 is shown a prior art device which includes a base plate 10 on which a shaft 11 is mounted for rotation on bearings (not shown). In order to prevent reverse rotation of the shaft 11, a stop member 12 is carried on the base plate and stands upwardly along side the shaft 11. The stop member co-operates with a pair of pawls 13 and 14 which are carried on the shaft for rotation therewith. The pawls are mounted on the shaft for pivotal movement of each pawl about an axis parallel to the axis 11A of the shaft. Thus as shown in the top the pawls 13 is moved by gravity so that an end projects outwardly from the shaft for engaging an upper end of the stop 12 in the event that the shaft rotates slowly in the counter clockwise direction. The pawl 14 on the underside to the contrary is arranged by gravity so that it is retracted. Thus if the shaft rotates in the forward direction or clockwise direction, the pawl bypasses the stop block and allows the shaft to commence rotation in the forward direction. As the shaft increases in angular velocity, centrifugal force pulls the pawls inwardly to retracted positions so that the shaft is free to rotate in the forward direction at high speed without the pawls engaging the stop block.

The pawls 13 and 14 are carried in a pair of parallel plates 16 and 17 mounted on a sleeve 18. The sleeve 18 is formed in two parts which are clamped together on either side of the shaft so as to surround the shaft. When clamped together the two parts forming the sleeve carry the plates 16 and 17 thus defining a slot lying generally in a radial plane of the axis 11A for the pawls to lie in the same plane mounted on a pivot pin 19 bridging the plate 16 and 17.

In the stationary position shown in FIG. 8, gravity pulls the pawls so that the upper pawl projects outwardly and the inner pawl is retracted. This is obtained by providing a weighted end 20 of the pawl which causes the required pivotal movement about the pivot pin 19 and extends the butting end 21 of the pawl which is of lighter weight for abutting the stop 12. At the underside the pawl 14 is pivoted by the weighted end to the retracted position at which the lighter end 21 engages a stop 22.

This arrangement has a major disadvantage that it operates only when the shaft is in the horizontal orientation and cannot operate in the vertical orientation of the shaft which is a common requirement for the mounting of shafts.

A further disadvantage is that a slot 10a must be cut in the base plate to accommodate the structure to prevent interaction between the base plate and the elements rotating with the shaft.

A further disadvantage is that the construction is relatively expensive in view of the fabrication of the various plates and the sleeve 18.

Turning now to the arrangement of the present invention as illustrated in FIGS. 1 to 7, there is provided a base plate 10 on which is mounted a shaft 11 for rotation about bearings 11B mounted on the base plate 10. The bearings 11B are of a conventional nature and conventional dimensions thus supporting the shaft at a spacing from the base plate which can be adjusted using spacers. The base plate may form a component of a machine in which the shaft is mounted for rotation and commonly the machine will comprise a fan in which there is provided a motor M coupled to the shaft and a fan F mounted on the other end of the shaft both of which are illustrated merely schematically as these are of a conventional construction. Of course in other fields the driven element may be other than a fan.

The back stop device of the present invention comprises a stop member 30 in the form of a mounting plate 31 attached to the base plate 10 and an upstanding stop plate 32 for abutting the components carried on the shaft 11. The stop plate 32 includes an abutment face 33 which extends along a radius of the axis 11A of the shaft 11. The edge 33 is formed on the stop member at a position spaced on the opposite side of the shaft from the plate 10 so as to be a short distance angularly retarded relatively to the top dead centre position of the shaft. Thus as shown the edge 33 is arranged approximately at the ten o'clock position relative to the twelve o'clock top dead centre position. The edge 33 forms a front edge and the plate includes a top edge 34, an outer edge 35 spaced well away from the shaft and an inner edge 36 closely adjacent the shaft. The edges 35 and 36 are well spaced to provide a sufficient distance or width of the stop member to provide sufficient strength so that the stop member is resistant to bending from impact by the elements mounted on the shaft even in the event of significant force being applied in the reverse rotation direction of the shaft.

The elements generally indicated at 40 mounted on the shaft comprise a collar 41 and a pair of wing members 42 and 43. The collar 41 is formed in two parts 44 and 45. These two parts include a generally semi-cylindrical inside surface for engaging around the shaft 11 and an outer surface which generally follows the same circular shape except that the ends where each of the parts is cut to form an end portion 46 with a flat face lying generally in a radial plane of the axis 11A. Thus when the two pieces are brought together the end parts 46 are closely adjacent with the end faces facing one another but spaced by a distance sufficient to receive the wing member 42, 43 therein. The end parts with their adjacent end faces are clamped together by screw fasteners 48. The two pieces 44 and 45 are symmetrical so as to be accurately balanced. The two pieces are formed by laser cutting from sheet metal plate so that the width is constant in a direction axial of the shaft. The end pieces are formed by recessing on the outside surface of the end piece to define a flat outer face contacting a thinner piece of the semi-cylindrical element surrounding the shaft so as to receive a face of the screw fastener butting the outside surface and pulling together the inside surfaces. The screw fasteners 48 are formed by a bolt and a nut and they are fastened in opposite directions to retain the symmetry and balance of the system around the axis 11A.

The spacing between the end faces of the end parts of the collar pieces is sufficient to receive the wing members for free pivotal movement therebetween. The wing members are arranged for pivotal movement on the screw fastener 48 which passes through a hole in the wing member. Thus the mounting of the wing members is very simple and provides both a support for the sides of the wing member and the pivot for the wing member in the coupling which holds the collar in place.

The wing members are cut from sheet metal again by laser cutting so the wing members are basically flat, thin in the axial plane between the two end faces.

Each of the wing members is formed from a generally V-shaped element including two legs 50 and 51. At the apex of the V-shape is provided the hole for receiving the screw fasteners 48 which act as a pivot pin. Each leg has an outer surface 52, 53 respectively on the side of the leg adjacent to the outer surface of the shaft 11.

The surfaces 52 and 53 act to define two positions for the wing members. Thus in the first position the leg 50 lies against the outside surface of the shaft and thus acts to define a retracted position of the leg 50. The other leg 51 is a weighted leg having added weight, which may be formed by a separate attached weight 55, so as to actuate movement of the wing member. In the extended position of the leg 50 the surface 53 of the leg 51 engages the shaft 11.

While the two positions are defined by the edges of the wing member abutting the shaft, other stop members could be provided different from the shaft itself to define the extended and retracted positions. However in is convenient to provide the engagement of the wing member itself with the shaft since this avoids the necessity for mounting other elements and minimises the number of elements.

The weighted leg has the additional weight 55 but could be weighted by being larger than the leg 50 since it is the differential in weight between the two legs which defines the actuation of the device as described herein after.

It will be noted that the fastener 48 has an axis which is at right angles to the axis 11A and is parallel to a tangent T to the axis at the surface of the shaft 11 and located at the collar 41. The wing member is thus a relatively thin plate lying in an axial plane of the axis 11A.

It will be appreciated that minor deviations from the direct right angle and parallel positions over a few degrees can be accommodated without affecting the operation of the device.

In order to minimise the weight of the wing members they are generally V-shaped thus defining the pivot at the fastener 48 and the two legs. However it will be appreciated that the V-shape is not essential and any shape is possible provided that the wing members provide an element or part which engages the edge 33 and the wing members can pivot side to side on the pivot pin depending upon gravity and centrifugal force as described above.

Figure 1:
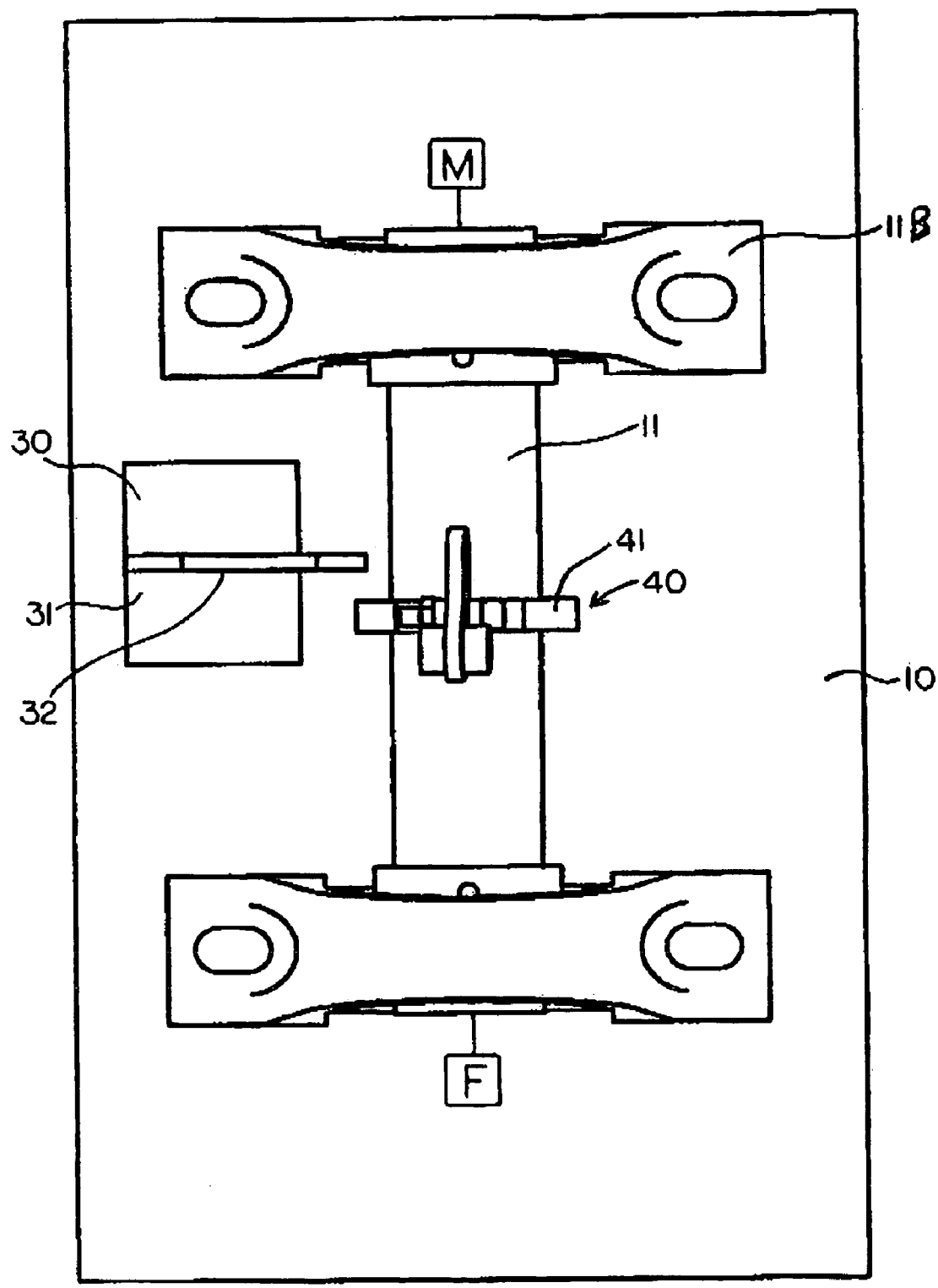
FIG. 1 is a top plan view of the device according to the present invention.
Figure 2:
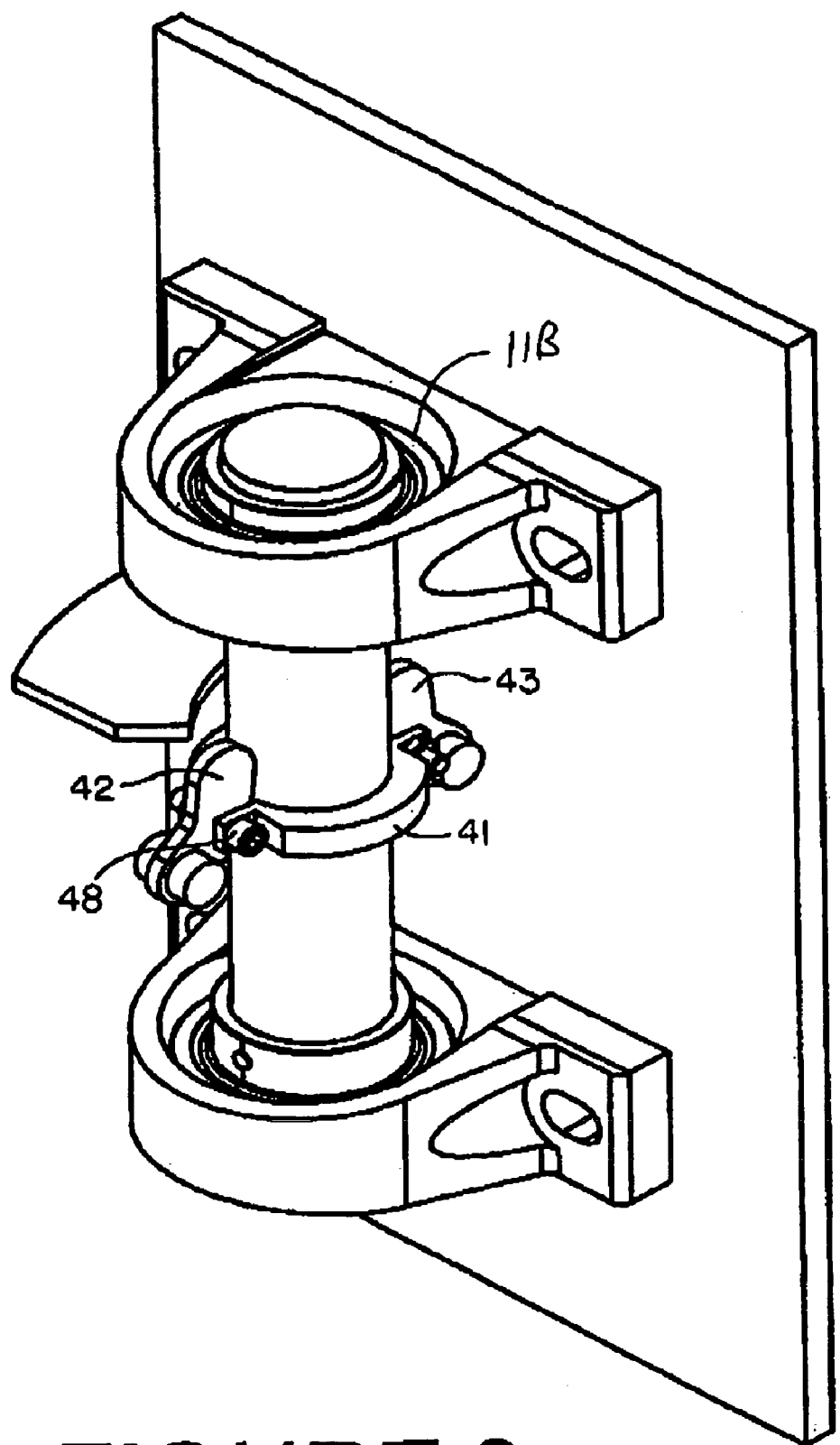
FIG. 2 is an isometric view of the device of FIG. 1.
Figure 3:
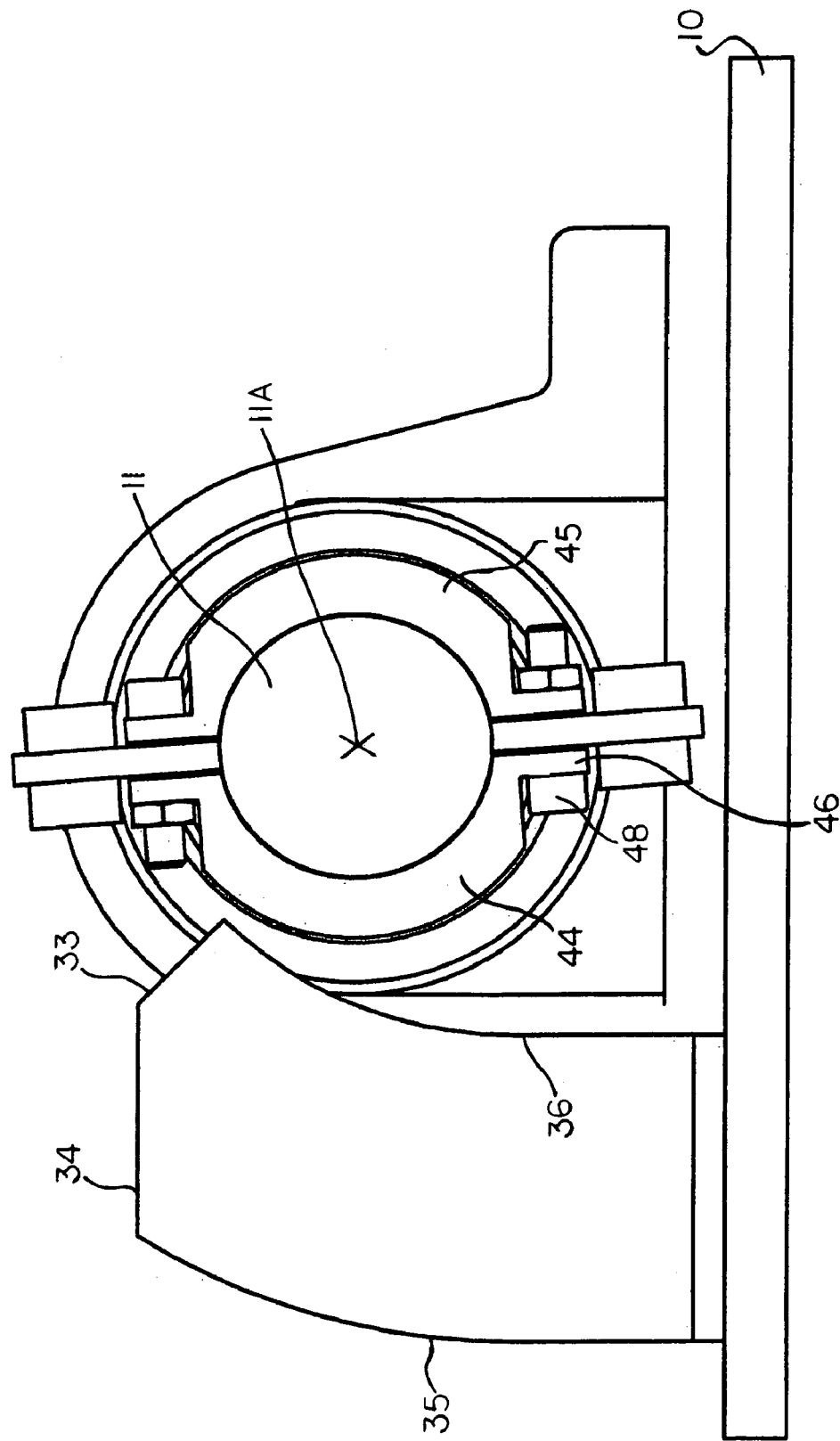
FIG. 3 is end elevational view of the device of FIG. 1.
Figure 3A:
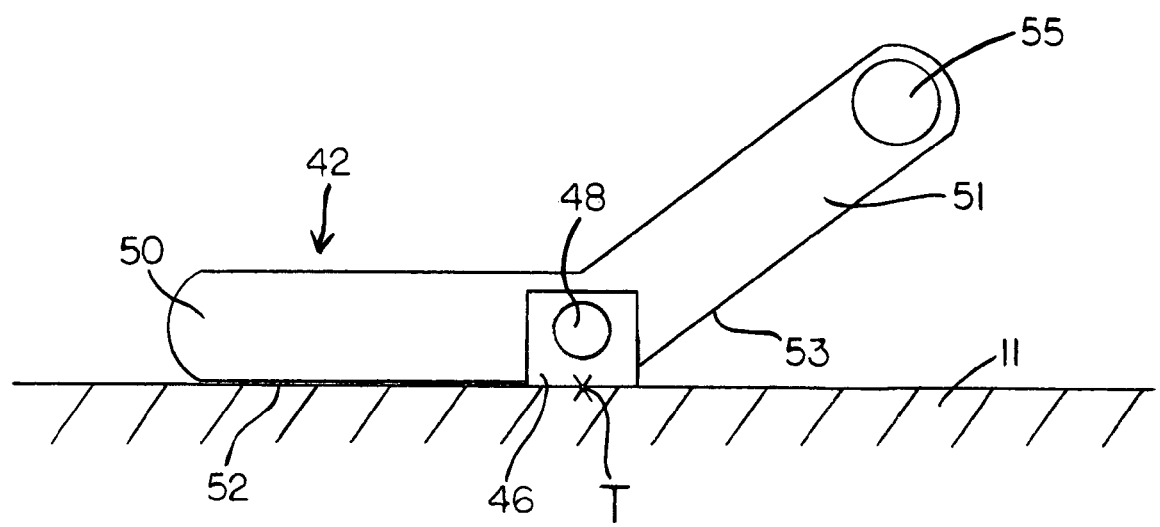
FIG. 3A is a cross sectional view in an axial plane of the shaft of the device of FIG. 1.
Figure 4:
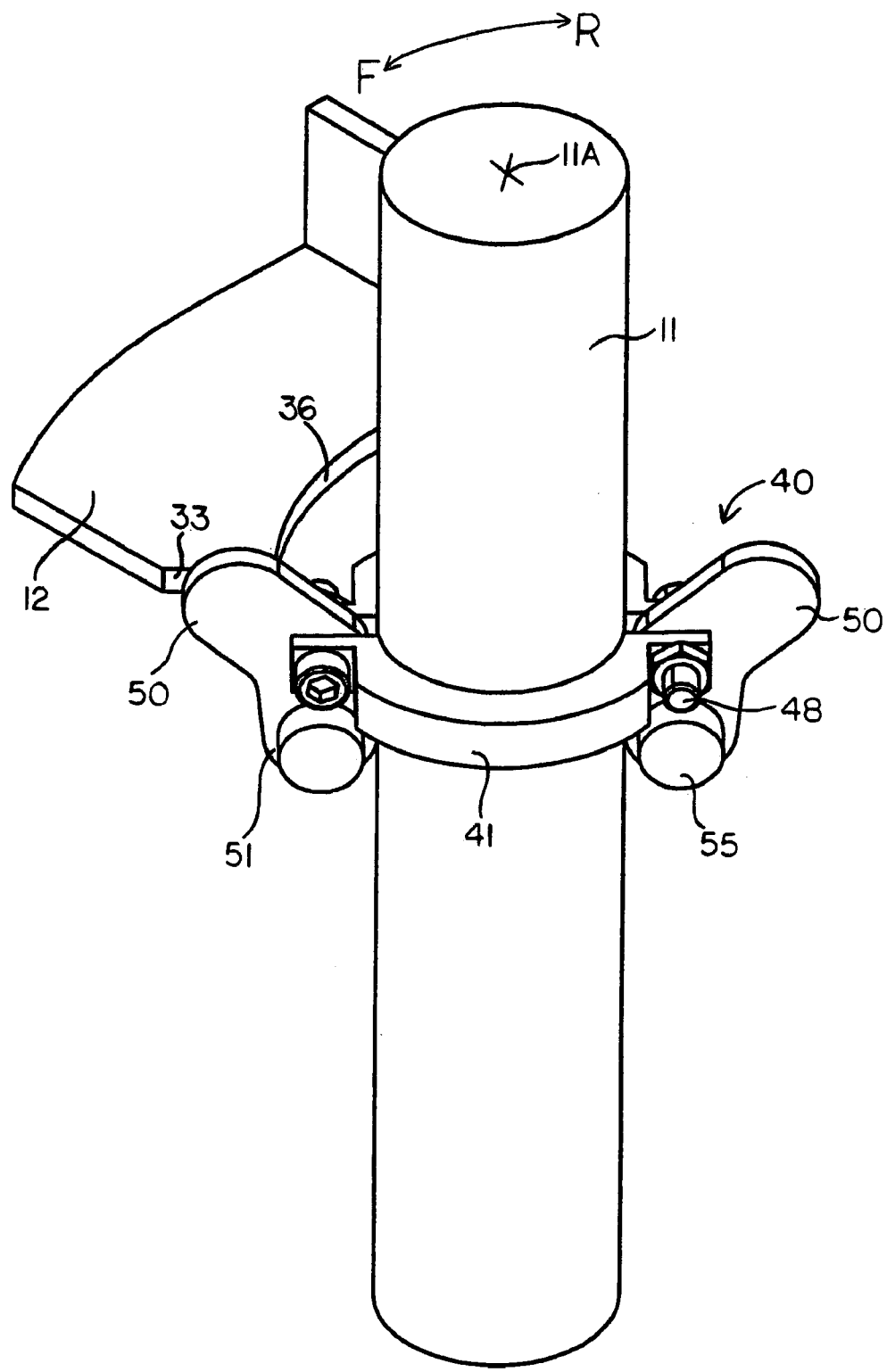
FIG. 4 is an illustration of the components of the back stop device in a stationary position with a vertical orientation of the shaft.

Turning now to FIG. 4, the shaft 11, stop member 12 and shaft elements 40 are shown in isolated position to show the position of operation wherein the shaft axis 11A is vertical. In this position the stop member is aligned with the leg 50 so that the stop edge 33 abuts the leg 50 when it is moved to the extended position and avoids the leg 50 when it is moved to the retracted position.

In the arrangement shown in FIG. 4 therefore with the shaft vertical, the legs 51 are arranged on the underside of the collar 41 so that with the shaft stationary gravity pulls both legs 51 downwardly and inwardly to the position where the leg 51 butts against the shaft 11 thus moving the legs 50 to the extended position for impacting upon or butting with the stop edge 33. Thus is the shaft is rotated in the reverse direction R, the leg 50 which is exposed in front of that edge 33 impacts against the edge 33 thus halting further reverse rotation of the shaft 11. In the event that the shaft slowly rotates in the forward direction, the leg 50 on the angularly retarded side of the edge 33 can engage the surface 36 which gradually sweeps the leg 50 into the retracted position to bypass the edge 33 from the rear side of that edge 33. Thus rotation of the forward direction is not affected and can start slowly by the surface 36 wiping each leg 50 into the retracted position as it passes the surface.

Figure 5:
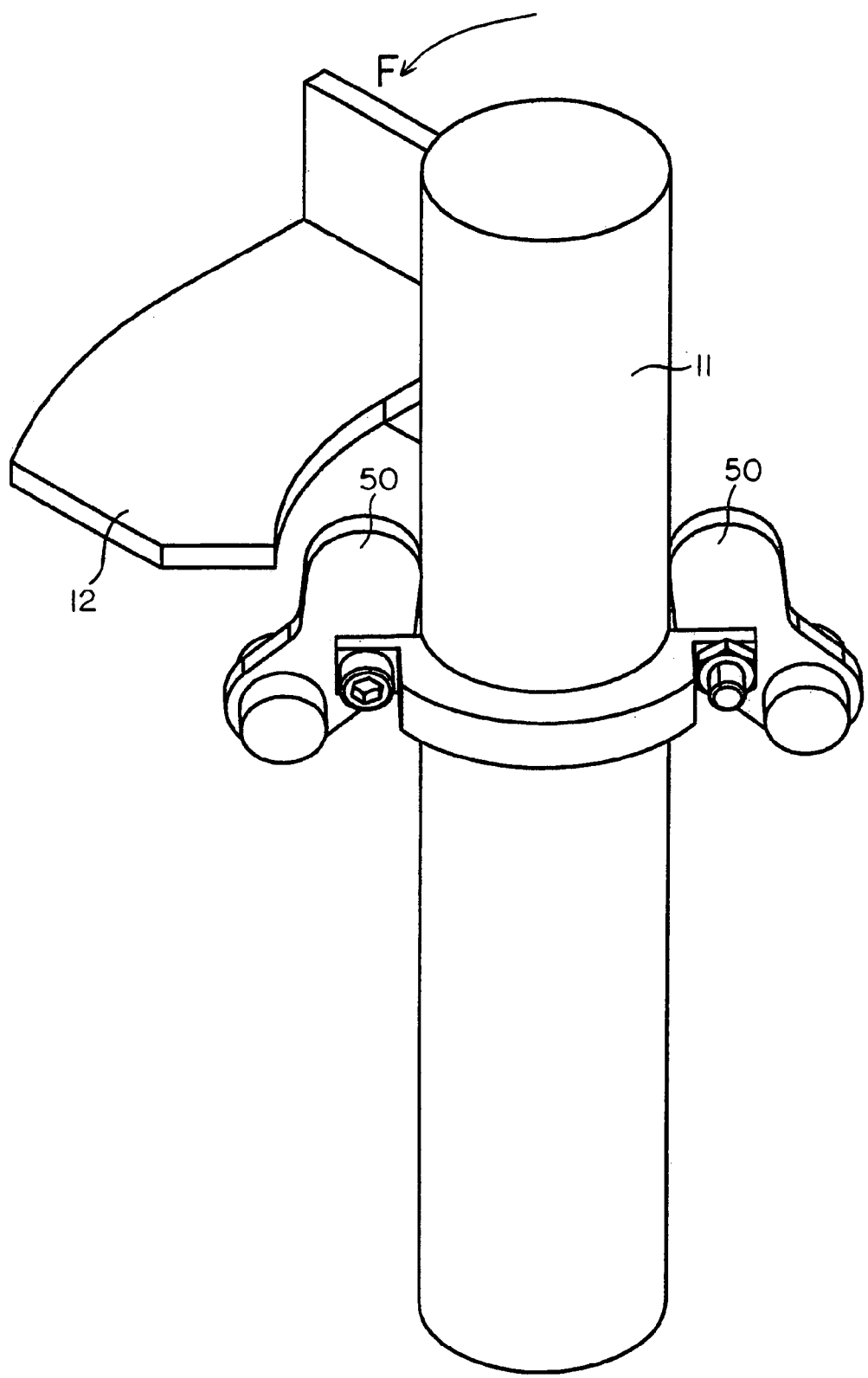
FIG. 5 is a view of the components of FIG. 4 with the shaft rotating in the forward direction.

In this position shown in FIG. 5, when the shaft 11 is rotating at higher speed beyond the predetermined speed, the wing members move to the retracted position of the legs 50 so they are moved into the position abutting the shaft with the weighted legs 51 flung outwardly by the centrifugal force thus in the stationary position the gravity on the weighted legs acts to move the legs to the position in which the reverse rotation is prevented. When the shaft is rotating is a forward direction at a rate greater than the predetermined rate, centrifugal force acting on the weighted legs moves the legs 50 to the retracted position.

Figure 6:
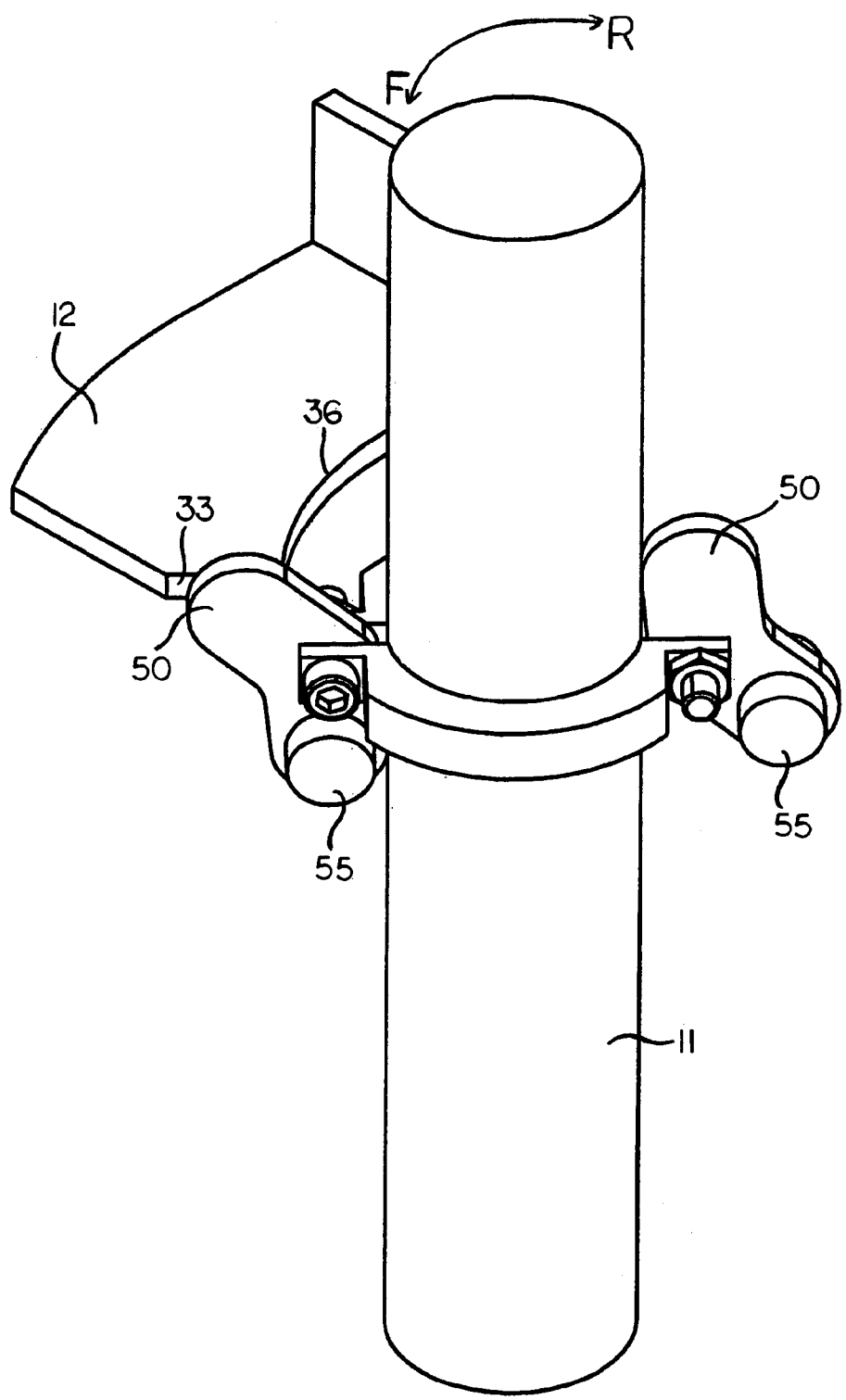
FIG. 6 is a view of the components of the back stop device with the shaft in a horizontal orientation in a stationary position.
Figure 7:
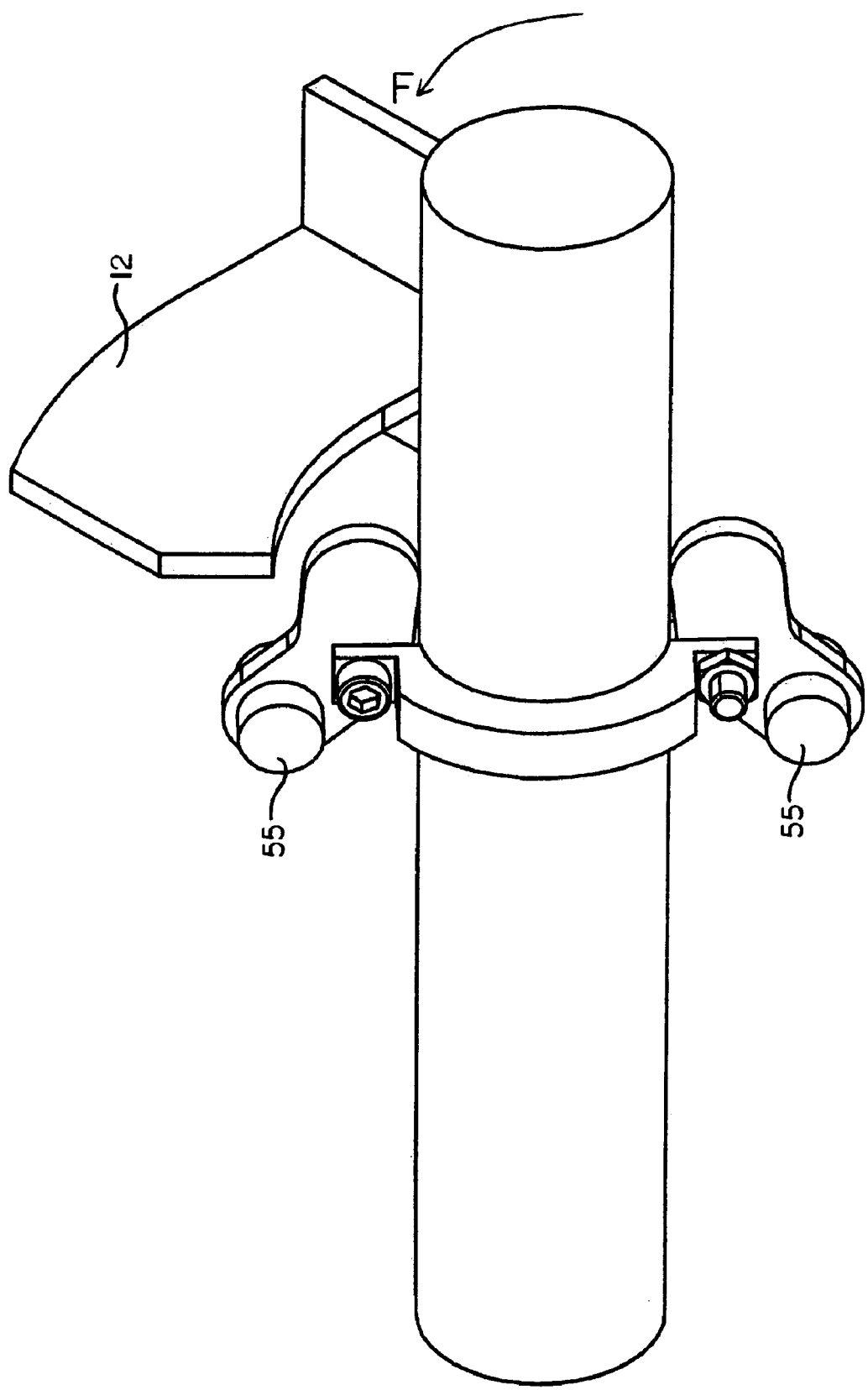
FIG. 7 is a view of the components of FIG. 6 with the shaft rotating in the forward direction.

Turning now to FIGS. 6 and 7, the same situations are shown in respect of a shaft which is arranged horizontally. Thus in this arrangement the shaft 11 is horizontal as positioned adjacent the stop member 12 as previously described. Thus in FIG. 6 that wing member which is temporarily at the top of the shaft is moved to a position in which the weight 55 is pulled downwardly by gravity to move the weight into the position abutting the shaft so that the leg 50 is moved to the extended position. Thus with the edge 33 slightly above the shaft, reverse rotation of the shaft causes the extended leg 50 to abut against the edge 33. Gravity acting on the wing member which is temporarily at the bottom of the shaft pulls the weight 55 again downwardly thus bringing the leg 50 into the retracted position so that as the shaft rotates in the forward direction that leg remains in the retracted position thus bypassing the surface 36 freely without contact and missing the stop edge 33 allowing the shaft to rotate in the forward direction. When the wing member that is temporarily below the shaft moves to a position beyond the stop edge 33, gravity acts to move it to the position which is the position of the wing member at the top of the shaft so that the slow rotation of the shaft oscillates the wing members between the retracted and extended positions depending on whether they are above or below the shaft. Thus in the horizontal orientation the device operates to prevent reverse rotation by the abutment of the extended leg 50 on the stop edge 33 while not in any way interfering with the forward rotation of the shaft.

As shown in FIG. 7 again the weights 55 bias the wing members so that the legs 50 are in the retracted position as the shaft rotates at high speed in the forward direction thus causing the wing members to pass by the stop 12 without in any way interfering with or contacting the stop 12.

Since various modifications can be made in my invention as herein above described, and many apparently widely different embodiments of same made within the spirit and scope of the Claims without department from such spirit and scope, it is intended that all matter contained in the accompanying specification shall be interpreted as illustrative only and not in a limiting sense.

The invention claimed is:
1. Apparatus comprising:
   a base member;
   a shaft carried on bearings attached to the base member in a mounting plane of the base member such that the shaft rotates about a longitudinal axis of the shaft spaced from the base member;
   and an assembly for use in preventing reverse rotation of the shaft carried on a base member, the assembly comprising:
   a stop member mounted on the base member adjacent the shaft, the stop member having an abutment surface at a position spaced outwardly from the shaft;
   a mounting member mounted on the shaft;
   at least one wing member mounted on the mounting member;
   said at least one wing member being mounted on the mounting member for pivotal movement relative to the shaft about a pivot axis of the wing member generally at right angles to the axis of the shaft and parallel to a tangent to the axis of the shaft at its respective position on the shaft;
   said at least one wing member being pivotal from a retracted position, in which it is free from the stop member to allow the shaft to rotate without engagement of the wing member with the stop member, to an extended position in which it engages the abutment surface of the stop member to prevent reverse rotation;
   said at least one wing member being shaped and arranged such that, with the shaft stationary, gravity acting upon the said at least one wing member moves the said at least one wing member into the extended position for engaging the stop member;
   and said at least one wing member being shaped and arranged such that rotation of the shaft beyond a predetermined angular velocity causes centrifugal force to move the said at least one wing member to the retracted position;
   wherein the mounting member comprises a collar which surrounds the shaft and is clamped around the shaft;
   and wherein said at least one wing member has a generally v-shaped abutment edge defining two leg portions and an apex adjacent the shaft and is pivotal about its axis adjacent the apex of the v-shaped abutment edge such that the retracted and extended positions are defined by engagement of respective ones of the leg portions on the outer surface of the shaft.

2. The apparatus according to claim 1 wherein said at least one wing member is shaped and arranged such that, with the axis of the shaft vertical and with the shaft stationary, gravity acting upon said at least one wing member moves said at least one wing member from the retracted position into the extended position for engaging the stop member.

3. The apparatus according to claim 2 wherein the stop member includes a guide surface for engaging the wing member located at an angular position thereon which is angularly retarded relative to the abutment surface and relative to the direction of forward rotation of the shaft such that, as the shaft and the wing member thereon rotate in the forward direction at an angular velocity less than said predetermined velocity, the wing member engages the guide surface and is moved thereby into the retracted position to by-pass the abutment surface.

4. The apparatus according to claim 1 wherein said at least one wing member comprises two wing members arranged on the mounting member at diametrically opposed positions relative to the axis of the shaft.

5. The apparatus according to claim 1 wherein the collar is formed of a plurality of separate pieces each fastened to the next by a screw fastener such that the pieces are pulled radially inwardly by the screw fasteners.

6. The apparatus according to claim 5 wherein said at least one wing member is mounted at a junction between two collar pieces.

7. The apparatus according to claim 5 wherein each collar piece has an end face generally radial to the axis such that said at least one wing member is located between the end faces for pivotal movement on the screw fastener between the two collar pieces.

8. The apparatus according to claim 5 wherein said at least one wing member is mounted for pivotal movement on the screw fastener between two collar pieces.

9. The apparatus according to claim 5 wherein there are two collar pieces and said at least one wing member comprises two wing members each located between respective ends of the collar pieces.

10. The apparatus according to claim 1 wherein the stop member comprises a plate portion cut from sheet metal lying in a radial plane of the axis of the shaft and having the abutment surface at one edge of the plate portion.

11. The apparatus according to claim 1 wherein the wing members and the stop member and the mounting member are formed from laser cut pieces.

12. The apparatus according to claim 1 further comprising a fan mounted on the shaft driven by a motor.

13. Apparatus comprising:
a base member;
a shaft carried on bearings attached to the base member in a mounting plane of the base member such that the shaft rotates about a longitudinal axis of the shaft spaced from the base member;
and an assembly for use in preventing reverse rotation of the shaft carried on a base member assembly comprising:
a stop member mounted on the base member adjacent the shaft, the stop member having an abutment surface at a position spaced outwardly from the shaft;
a mounting member mounted on the shaft;
at least one wing member mounted on the mounting member;
said at least one wing member being mounted on the mounting member for pivotal movement relative to the shaft about an axis of the wing member generally at right angles to the axis of the shaft parallel to a tangent to the axis of the shaft at its respective position on the shaft;
said at least one wing member being pivotal from a retracted position, in which it is free from the stop member to allow the shaft to rotate without engagement of said at least one win member with the stop member, to an extended position in which it engages the abutment surface of the stop member to prevent reverse rotation;
said at least one wing member being shaped and arranged such that, with the shaft stationary, gravity acting upon the wing member moves said at least one wing member into the extended position for engaging the stop member;
and said at least one wing member being shaped and arranged such that rotation of the shaft beyond a predetermined angular velocity causes centrifugal force to move said at least one wing member to the retracted position;
wherein the mounting member comprises a collar which surrounds the shaft and is clamped around the shaft; and
wherein said at least one wing member defines two leg portions of equal length and an apex between the leg portions adjacent the shaft and is pivotal about its axis adjacent the apex between the leg portions wherein one of the leg portions carries a weight thereon so as to have a greater weight than the other, so as to move outwardly from the shaft under centrifugal forces.

14. Apparatus comprising:
a base member;
a shaft carried on bearings attached to the base member in a mounting plane of the base member such that the shaft rotates about an axis spaced from the base member;
and an assembly for use in preventing reverse rotation of the shaft carried on a base member, the assembly apparatus comprising:
a stop member mounted on the base member adjacent the shaft, the stop member having an abutment surface at a position spaced outwardly from the shaft;
a mounting member mounted on the shaft;
at least one wing member mounted on the mounting member;
said at least one wing member being mounted on the mounting member for pivotal movement relative to the shaft from a retracted position, in which it is free from the stop member to allow the shaft to rotate without engagement of the said at least one wing member with the stop member, to an extended position in which it engages the abutment surface of the stop member to prevent reverse rotation;
and said at least one wing member being shaped and arranged such that rotation of the shaft beyond a predetermined angular velocity causes centrifugal force to move the said at least one wing member to the retracted position;
wherein the mounting member comprises a collar which is separate from and is clamped around the shaft;
wherein the collar is formed of a plurality of separate pieces each fastened to the next by a screw fastener such the pieces are pulled radially inwardly by the screw fastener;
and wherein each said at least one wing member is mounted at a junction between two collar pieces.

15. The apparatus according to claim 14 wherein said at least one wing member comprises two wing members arranged on the mounting member at diametrically opposed positions relative to the axis of the shaft.

16. The apparatus according to claim 15 wherein each collar piece has an end face generally radial to the axis such that said at least one wing member is located between the end faces for pivotal movement on the screw fastener between the two collar pieces.

17. The apparatus according to claim 14 wherein said at least one wing member has a generally V-shaped abutment edge defining two leg portions and an apex adjacent the shaft and is pivotal about its axis adjacent the apex of the V-shaped abutment edge such that the retracted and extended positions are defined by engagement of respective ones of the leg portions on the outer surface of the shaft.

18. The apparatus according to claim 14 wherein said at least one wing member defines two leg portions and an apex between the leg portions adjacent the shaft and is pivotal about its axis adjacent the apex between the leg portions wherein one of the leg portions has a greater weight than the other so as to move outwardly from the shaft under centrifugal forces.

19. The apparatus according to claim 15 wherein the wing members and the stop member and the separate collar pieces are formed from laser cut pieces.

20. Apparatus comprising:
a base member;
a shaft carried on bearings attached to the base member in a mounting plane of the base member such that the shaft rotates about a longitudinal axis of the shaft spaced from the base member;

and an assembly for use in preventing reverse rotation of the shaft carried on a base member, the assembly comprising:

a stop member mounted on the base member adjacent the shaft, the stop member having an abutment surface at a position spaced outwardly from the shaft;

a mounting member mounted on the shaft;

at least one wing member mounted on the mounting member;

said at least one wing member being mounted on the mounting member for pivotal movement relative to the shaft about a pivot axis of the wing member generally at right angles to the axis of the shaft and parallel to a tangent to the axis of the shaft at its respective position on the shaft;

said at least one wing member being pivotal from a retracted position, in which it is free from the stop member to allow the shaft to rotate without engagement of the wing member with the stop member, to an extended position in which it engages the abutment surface of the stop member to prevent reverse rotation;

said at least one wing member being shaped and arranged such that, with the shaft stationary, gravity acting upon said at least one wing member moves said at least one wing member into the extended position for engaging the stop member;

and said at least one wing member being shaped and arranged such that rotation of the shaft beyond a predetermined angular velocity causes centrifugal force to move said at least one wing member to the retracted position;

wherein the mounting member comprises a generally annular collar which surrounds the shaft and is clamped around a peripheral surface of the shaft;

and wherein said at least one wing member is shaped and arranged such that, with the axis of the shaft vertical and with the shaft stationary, gravity acting upon said at least one wing member moves said at least one wing member from the retracted position into the extended position for engaging the stop member.

21. The apparatus according to claim 20 wherein the stop member includes a guide surface for engaging the wing member located at an angular position thereon which is angularly retarded relative to the abutment surface and relative to the direction of forward rotation of the shaft such that, as the shaft and the wing member thereon rotate in the forward direction at an angular velocity less than said predetermined velocity, the wing member engages the guide surface and is moved thereby into the retracted position to by-pass the abutment surface.

22. The apparatus according to claim 20 wherein said at least one wing member comprises two wing members arranged on the mounting member at diametrically opposed positions relative to the axis of the shaft.

23. The apparatus according to claim 20 wherein the collar is formed of a plurality of separate pieces each fastened to the next by a screw fastener such that the pieces are pulled radially inwardly by the screw fasteners.

24. The apparatus according to claim 23 wherein said at least one wing member is mounted at a junction between two collar pieces.

25. The apparatus according to claim 23 wherein each collar piece has an end face generally radial to the axis such that said at least one wing member is located between the end faces for pivotal movement on the screw fastener between the two collar pieces.

26. The apparatus according to claim 23 wherein said at least one wing member is mounted for pivotal movement on the screw fastener between two collar pieces.

27. The apparatus according to claim 23 wherein the generally annular collar comprises two collar pieces and said at least one wing member comprises two wing members each located between respective ends of the collar pieces.

* * * * *